United States Patent [19]

Fletcher

[11] 4,164,804

[45] Aug. 21, 1979

[54] LATCH DEVICE

[75] Inventor: Thomas A. Fletcher, Dana, N.C.

[73] Assignee: General Electric Company, Schenectady, N.Y.

[21] Appl. No.: 950,884

[22] Filed: Oct. 12, 1978

[51] Int. Cl.$^2$ .............................................. F16L 33/12

[52] U.S. Cl. .................................... 24/273; 24/68 R; 285/409; 362/396

[58] Field of Search ............ 24/273, 270, 68 J, 68 BJ, 24/68 R, 68 TT; 285/409, 82; 362/396, 374

[56] References Cited

U.S. PATENT DOCUMENTS

| | | | |
|---|---|---|---|
| 484,235 | 10/1892 | Plunkett | 24/68 R |
| 1,780,169 | 11/1930 | Chadbourne | 24/201 HE |
| 2,731,280 | 1/1956 | Goodliffe | 24/273 |
| 3,670,371 | 6/1972 | Swanson | 24/68 T |

*Primary Examiner*—Bernard A. Gelak

*Attorney, Agent, or Firm*—Sidney Greenberg; Lawrence R. Kempton; Philip L. Schlamp

[57] ABSTRACT

Latch for luminaire clamp band comprises hinged link member connected to a latch lever, and a channel-shaped spring catch attached to the link member for holding the link member in engagement with the latch hook.

5 Claims, 5 Drawing Figures

LATCH DEVICE

The present invention relates to latch devices, and more particularly, to a latch device for a luminaire closure, such as a clamp band.

In particular, the invention relates to a latch device comprising a link or bail member engageable with a hook or strike for holding two parts together.

It is an object of the invention to provide an improved latch device of the above type wherein the latch link and latch strike and held against accidental separation.

Another object of the invention is to provide a latch device of the above type which is simple in construction and economical to make, and is reliable in operation.

Other objects and advantages will become apparent from the following description and the appended claims.

With the above objects in view, the present invention in one of its aspects relates to a latch device comprising, in combination, a base member adapted to be fixed to one of two parts to be detachably connected to each other, a lever member hingedly connected at one end to the base member and formed with a lip projecting from that end, a generally U-shaped link member having free ends pivotally connected to the lever member intermediate the ends of the latter and having a bight portion adapted to engage hook means on the other of the parts, and a channel-shaped spring catch having opposite sides resiliently compressible toward each other, the spring catch being loosely attached at one of its sides to the lever member and being formed on the other of its sides with a flange engageable with the lip of the lever member, whereby when the link member engages the hook means and the flange of the spring catch is inserted into the lip with the other side of the spring catch bearing against the hook means, the spring catch resiliently retains the link member in firm engagement with the hook means.

In a typical use of the described latch device, it is connected at its base member adjacent one end of a clamp band employed for holding parts of a luminaire in assembly, the link member engaging a hook or the like fixed at the opposite end of the clamp band.

The invention will be better understood from the following description taken in conjunction with the accompanying drawing, in which.

Figure 1:
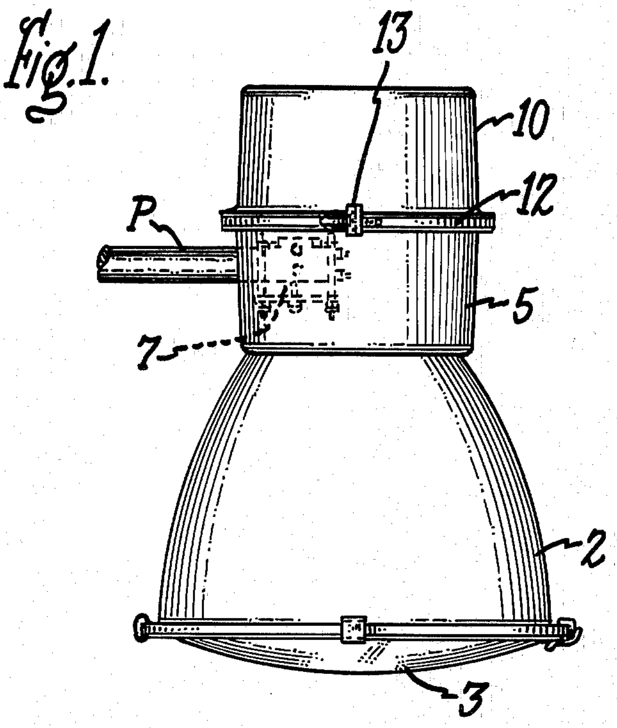
FIG. 1 is an elevational view of a luminaire having a clamp band with a latch device in accordance with an embodiment of the invention.
Figure 2:
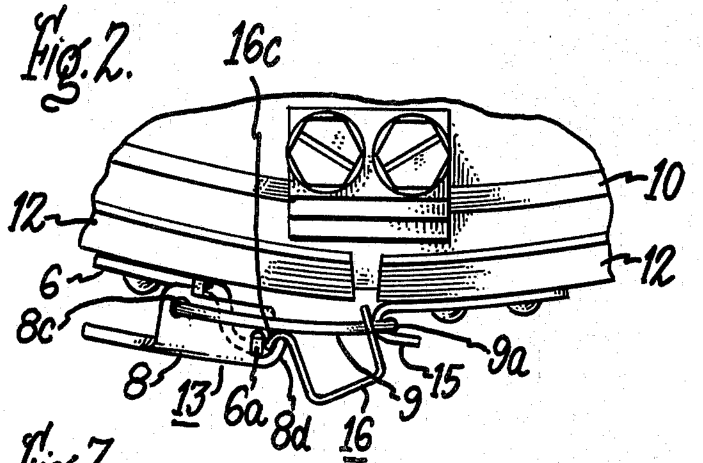
FIG. 2 is a detailed plan view of the latch device employed in the FIG. 1 luminaire.
Figure 3:
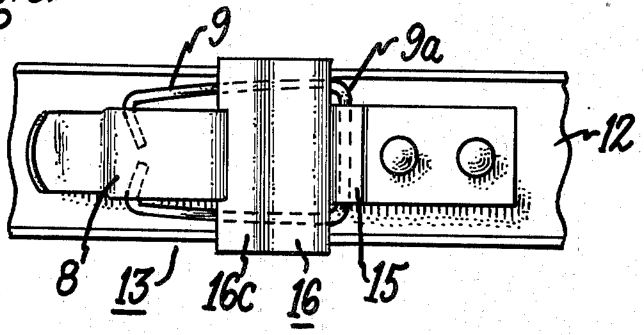
FIG. 3 is an elevational view of the latch device.

Referring now to the drawings, and particularly to FIG. 1, there is shown a luminaire comprising an optical assembly 1 including dome-shaped reflector 2 enclosing a lamp (not shown) and closed at its bottom by light transmitting cover 3. Secured at the top of optical assembly 1 is slipfitter housing 5 enclosing pipe clamp 7 for mounting the luminaire on support pipe P. Ballast housing 10 covers the open top of slipfitter housing 5, and these housings are secured together at their mating rims by clamp band 12 having free ends latched together by latch 13 (see FIG. 2).

Figure 4:
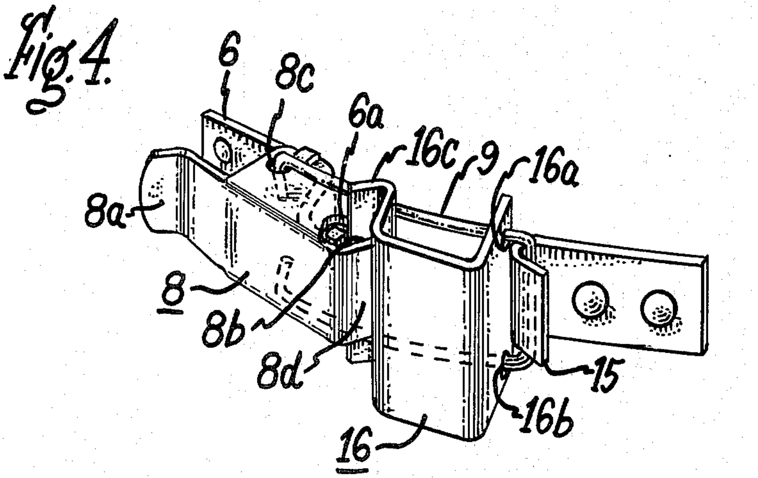
FIG. 4 is a perspective view of the latch device.

Latch 13 comprises base member 6 secured by rivets or the like to clamp band 12 and channel-shaped latch lever 8 having a handle portion **8*a* projecting from one end. At its other end, lever 8 is formed with aligned openings 8*b* in its opposite sides in which pins 6*a* projecting from opposite sides of base member 6 are inserted (see FIGS. 2 and 4) for hingedly connecting lever 8 to base member 6. U-shaped link 9 is pivotally connected near the other end of lever 8 with its inturned free ends inserted in aligned apertures 8*c* in the sides of lever 8. The web or bight portion 9*a* of link 9 engages latch hook or strike 15 secured to the other end of clamp band 12. The latch structure as thus far described is of known or conventional type, and as will be understood, the latch is opened by pulling handle 8*a* outwardly so that lever 8 pivots about pins 6*a* of base member 6, permitting bight portion 9*a* of link 9 to move out of engagement with hook 15 for releasing clamp band 12** from its clamping position.

When the latch is in closed position with link 9 engaging latch hook 15, under some conditions when there is little or no tension on link 9 it is possible that the link will become disengaged from hook 15, thereby accidentally opening the latch.

In accordance with the invention, this problem is overcome by providing a spring retainer or catch for retaining link 9 in firm engagement with hook 15 while the latch is in closed position. In the embodiment illustrated, a channel-shaped spring catch 16 having spaced apertures **16*a*, 16*b* in one side (see FIG. 4) is attached to link 9 by means of the arms of the latter passing loosely through the apertures. Along the edge of its other side, catch 16 is formed with an outwardly directed flange 16*c*. In the locked assembly of the latch, flange 16*c* engages lip 8*d* formed at the end of lever 8 near openings 8*b*. Catch 16, which is typically made of spring metal, is arranged in the position illustrated, after the latch is locked, by pressing its two sides together so that flange 16*c* may engage the inner surface of lip 8*d* and then allowing the two sides to move apart. In this position, the side of catch 16 adjacent hook 15 resiliently presses against the hook while its other side presses against lever 8, thus preventing link 9 and hook 15 from moving toward each other and accidentally becoming disengaged. In addition, catch 16 and its flange 16*c* are so formed and dimensioned relative to lip 8*d* and link 9 that in the assembled position with flange 16*c* in engagement with lip 8*d*, flange 16*c* is urged transversely against link 9 so that the latter is pressed in a direction toward clamp band 12, thereby enhancing the secure engagement of link 9 with latch hook 15**.

Figure 5:
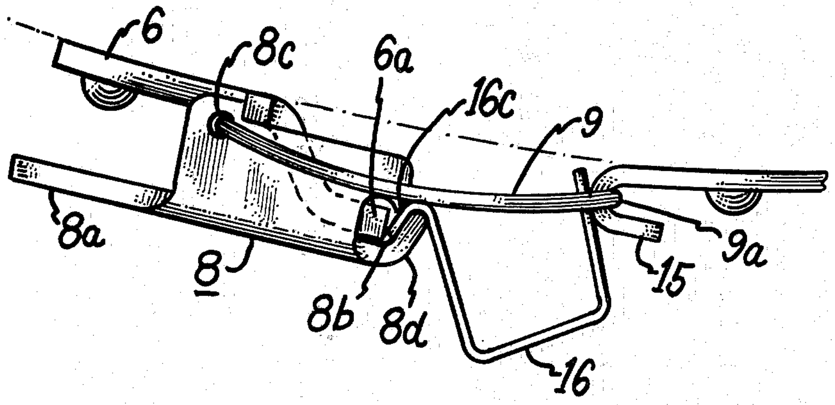
FIG. 5 is an enlarged plan view of the arrangement of the spring catch on the latch device.

The described arrangement is such that when the latch device is in locked position and spring catch 16 is in operative position with its flange **16*c* engaging lip 8*d* as seen in FIG. 5, lever handle 8*a* cannot be pulled outwardly to open the latch until the sides of spring catch 16 are first compressed and the catch is released from engagement with lip 8*d***. The arrangement thus positively ensures against inadvertent opening of the latch.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A latch device comprising in combination, a base member adapted to be fixed to one of two parts to be detachably connected to each other, a lever member hingedly connected at one end to said base member for movement between a locked and an unlocked position, said lever member being formed with a lip projecting from said end, a generally U-shaped link member comprising elongated arms having free ends pivotally connected to said lever member intermediate the ends thereof and having a bight portion adapted to engage hook means on the other of said parts, and a channel-shaped spring catch having opposite sides resiliently compressible toward each other, said spring catch being loosely attached at one of said sides to said link member and being formed on the other of said sides with a flange engageable with said lip of said lever member, whereby when the latch device is in locked position with said link member engaging the hook means and said flange of said spring catch engaging said lip with said other side of said spring catch bearing against the hook means, said spring catch resiliently retains said link member in firm engagement with the hook means.

2. A device as defined in claim 1, said one side of said spring catch having spaced apertures through which said elongated arms respectively freely pass.

3. A device as defined in claim 2, said flange when in engagement with said lip in the locked position of said lever member bearing transversely against said link member for holding the latter in firm engagement with the hook means.

4. A device as defined in claim 1 including a first part to which said base member is fixed and a second part having hook means engageable by said link member.

5. A device as defined in claim 4, said first and second parts being spaced end portions of clamp band means.

* * * * *